United States Patent
Martella et al.

(10) Patent No.: US 10,301,564 B2
(45) Date of Patent: May 28, 2019

(54) FUEL PROCESSING

(71) Applicant: Anergy Limited, Cardiff (GB)

(72) Inventors: Michael Martella, London (GB);
Matthew Martella, Bunbury (AU)

(73) Assignee: ANERGY LIMITED, Cardiff (GB)

(*) Notice: Subject to any disclaimer, the term of this patent is extended or adjusted under 35 U.S.C. 154(b) by 0 days.

(21) Appl. No.: 14/374,574

(22) PCT Filed: Feb. 12, 2013

(86) PCT No.: PCT/GB2013/050316
§ 371 (c)(1),
(2) Date: Jul. 25, 2014

(87) PCT Pub. No.: WO2013/121187
PCT Pub. Date: Aug. 22, 2013

(65) Prior Publication Data
US 2015/0027054 A1    Jan. 29, 2015

(30) Foreign Application Priority Data

Feb. 14, 2012 (GB) .................................. 1202537.5

(51) Int. Cl.
| | |
|---|---|
| *C10K 1/02* | (2006.01) |
| *C10K 1/06* | (2006.01) |
| *C10K 3/00* | (2006.01) |
| *C10K 3/02* | (2006.01) |
| *C10L 3/08* | (2006.01) |
| *C10L 3/10* | (2006.01) |

(Continued)

(52) U.S. Cl.
CPC .................. *C10L 3/08* (2013.01); *C10K 1/06* (2013.01); *C10K 3/023* (2013.01); *C10B 47/30* (2013.01); *C10B 53/02* (2013.01); *C10K 1/02* (2013.01); *C10K 3/005* (2013.01); *C10K 3/006* (2013.01); *C10L 3/104* (2013.01); *C10L 2290/02* (2013.01); *C10L 2290/04* (2013.01); *Y02E 50/14* (2013.01); *Y02P 20/145* (2015.11)

(58) Field of Classification Search
CPC .............................. C10L 3/08; C10L 2290/04
See application file for complete search history.

(56) References Cited

U.S. PATENT DOCUMENTS

| | | |
|---|---|---|
| 4,436,532 A | 3/1984 | Yamaguchi et al. |
| 2007/0204512 A1* | 9/2007 | Self .............................. C10J 3/66 48/197 FM |

(Continued)

FOREIGN PATENT DOCUMENTS

| | | |
|---|---|---|
| WO | WO2011060539 A1 | 5/2011 |
| WO | WO2011060556 A1 | 5/2011 |

*Primary Examiner* — Matthew J Merkling
(74) *Attorney, Agent, or Firm* — Gordon & Jacobson, P.C.

(57) ABSTRACT

A system for processing carbonaceous in-feed material has a pyrolyzer kiln for pyrolysis the carbonaceous in-feed material, the kiln operating in a slow pyrolysis process in which the in-feed material is pyrolyzed in the kiln for a period of minutes in order to produce primarily a gaseous output fraction; a steam reformer positioned downstream of the kiln to which combustion gasses from the pyrolyzer kiln are fed; a water scrubber positioned gas flow-wise downstream of the steam reformer; a methanation stage; a CO2 scrubbing stage. The system includes means for splitting the gas and directing a portion of the split gas back to the pyrolyzer kiln.

24 Claims, 1 Drawing Sheet

(51) Int. Cl.
    *C10B 47/30*    (2006.01)
    *C10B 53/02*    (2006.01)

(56) References Cited

U.S. PATENT DOCUMENTS

| | | | |
|---|---|---|---|
| 2009/0260286 A1* | 10/2009 | Sasauchi | C10J 3/24 48/113 |
| 2010/0224835 A1* | 9/2010 | Chornet | C10J 3/463 252/373 |
| 2010/0251615 A1 | 10/2010 | Market et al. | |

* cited by examiner

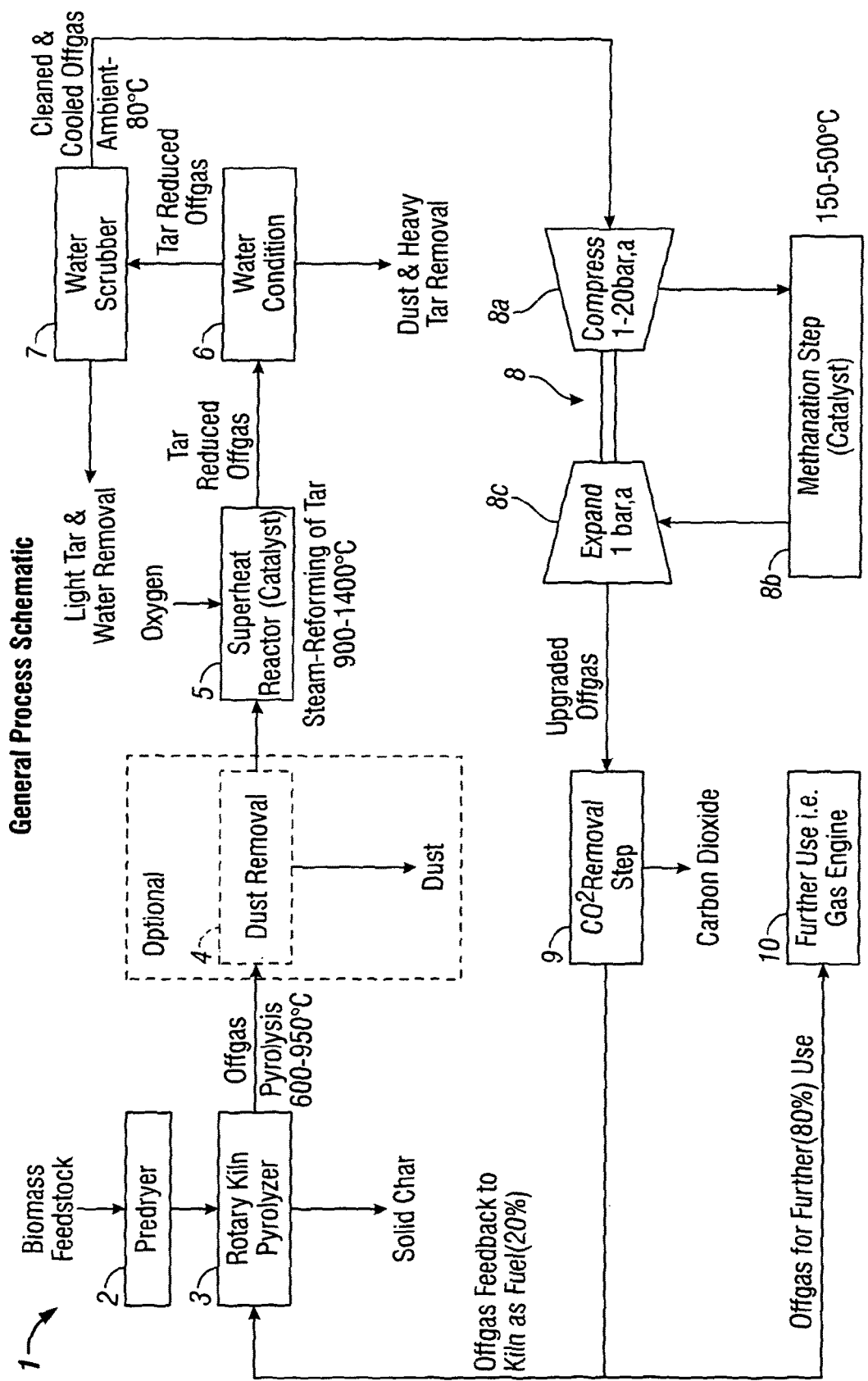

FUEL PROCESSING

CROSS-REFERENCE TO RELATED APPLICATIONS

This application is the national stage of International Patent Application No. PCT/GB2013/050316 filed on Feb. 12, 2013, which claims priority to British Patent Application No. GB 1202537.5 filed on Feb. 14, 2012, all of which are hereby incorporated by reference in their entireties as if fully set forth herein.

BACKGROUND

1. Field

The present invention relates to fuel processing and in particular a processing of solid carbonaceous material, for example carbonaceous waste such as biomass, mixed municipal waste, organic waste.

2. Related Art

The present invention is directed to the production of synthetic natural gas (SNG) from carbonaceous materials, such as biomass, coal or refuse-derived-fuel (RDF) using pyrolysis. Pyrolysis is the process of thermo-chemical degradation of the biomass feed-stock in a specially controlled atmosphere whereby the biomass is converted into liquid, gas and solid char fractions. The fraction of each solid/liquid/gas phase produced is a function of the conditions in the pyrolysis reactor. During the pyrolysis process, large hydrocarbon molecules of the parent biomass material are broken down into smaller hydrocarbon molecules. 'Fast pyrolysis' produces mainly a liquid fraction, known as bio-oil; slow pyrolysis produces mainly gas and solid char fractions. The present invention utilises 'slow pyrolysis' as the means of converting the biomass material into SNG whereby the carbonaceous material spends several minutes in the reaction zone.

SUMMARY

The object of the invention is to provide a processing system and method using slow pyrolysis, which results in the evolution of a gaseous product that has a sufficiently high calorific value to enable its use as a fuel such as a Synthetic Natural Gas (Syngas or SNG) fuel. It is also an object of the invention to provide a process that is highly efficient and suitable for application in relatively small scale situations, for example for producing fuel for use in generation systems of the order of 10 MW.

According to a first aspect, the present invention provides a system for processing carbonaceous in-feed material, the system comprising;
  a pyrolyzer kiln for pyrolysis the carbonaceous in-feed material, the kiln operating in a slow pyrolysis process in which the in-feed material is pyrolysed in the kiln for a period of minutes in order to produce primarily a gaseous output fraction;
  a steam reformer positioned downstream of the kiln to which combustion gasses from the pyrolyzer kiln are fed;
  a water scrubber positioned gas flow-wise downstream of the steam reformer
  a methanation stage;
  a CO2 scrubbing stage;
  wherein the system includes means for splitting the gas and directing a portion of the split gas back to the pyrolyzer kiln.

According to a second aspect, the present invention provides a method for processing carbonaceous in-feed material, the system comprising;
  i) feeding the carbonaceous in-feed material, into a pyrolyzer kiln;
  ii) a slow pyrolysing the in-feed material in the kiln for a period of minutes in order to produce primarily a gaseous output fraction;
  iii) directing the out-feed gas from the pyrolyzer kiln to a steam reformer positioned downstream of the pyrolyzer kiln;
  iv) subsequently directing the out-feed gas via a water scrubber stage, a methanation stage and a CO2 scrubbing stage, each of which is positioned gas flow-wise downstream of the steam reformer
  v) splitting the gas and directing a portion of the split gas back to the pyrolyzer kiln.

It is preferred that the gas splitting means is provided downstream of the water scrubber and/or the reformer.

It is preferred that the proportion of gas split off and diverted back to the pyrolyzer kiln is 30% (more preferably 20%) or less by volume.

It is preferred that the gas diverted back to the pyrolyzer kiln is combusted in the pyrolyzer kiln burner(s).

It is preferred that the gas is split downstream of the methanation stage.

It is preferred that the gas is split downstream of the CO2 scrubbing stage.

The primary output from the pyrolysis stage is gas rather than liquid. This is an important feature of the system and process in accordance with the invention.

It is preferred that the moisture content of the feedstock on exiting the pyrolyzer kiln stage is sufficiently high such that steam for the reformer stage is self generated during the process rather than being input into the reformer.

It is preferred that the kiln is an indirect fired rotary kiln. Beneficially the kiln is rotated about an horizontal axis.

It is preferred that the CO2 scrubbing stage is positioned downstream of the methanation stage.

It is preferred that the methanation stage includes passing the gas through a catalyst bed reactor. Beneficially, the gas is compressed before passing through the catalyst bed reactor.

It is preferred that the pyrolysing temperature in the pyrolyzer kiln is in the range 600 C-950 C. Beneficially the carbonaceous material is held in the kiln for a pyrolyzation time of between 1 and 60 minutes.

It is preferred that the reformer stage is conducted at a temperature in the range 900 C-1400 C. Beneficially Oxygen is added at the reforming stage, preferably to promote combustion and heating in the reformer stage.

It is preferred that before entering the pyrolyzer kiln, the in-feed gas is passed through a pre-dryer stage.

It is preferred that the pyrolyzer kiln includes a gas/solid separator in which the char and gas fractions are separated. As an alternative the gas/solid separator can be provided downstream of the pyrolyzer kiln.

BRIEF DESCRIPTION OF THE DRAWINGS

FIG. 1 is a schematic flow diagram of a process and system in accordance with an aspect of the invention.

DETAILED DESCRIPTION OF THE PREFERRED EMBODIMENTS

Referring to the drawing, the processing system 1 comprises a pre-dryer 2 to which carbonaceous solid feedstock material is supplied. The feedstock material is transported into the pre-dryer 2 using a chain type conveying system as is known in the art. The pre-dryer 2 which utilizes waste heat from the process to reduce the moisture content of the feedstock & hence increase the overall thermal efficiency of the process.

From the base of the pre-dryer 2, a screw type feed system conveys material into a rotary kiln pyrolyzer 3 in a controlled manner. Some moisture is retained by the feedstock which is required for the subsequent pyrolysis reactions & the steam-reforming steps. In the process of the invention the heating regime is specifically tailored to ensure that sufficient moisture is specifically retained in the feedstock in order to provide steam for the subsequent reforming step without the need for steam to be added.

The pyrolyzer kiln 3 is an indirectly-heated horizontal rotary kiln where the feedstock is transported along the inside of a rotating tube which is exposed to a source of heat on the outer tube surface & hence 'indirectly heated'. Heat is applied to the outer tube surface utilizing burners. During its passage along the kiln 3, the feedstock material undergoes various heat exchange processes & physicochemical changes. A typical sequence is drying, heating, and chemical decomposition reactions that cover a broad range of temperatures. The operating temperature in the pyrolyzer kiln 3 is typically from 400-950° C. and at atmospheric pressure. The residence time of the feedstock particles in the pyrolyzer kiln 3 is in the order of minutes to ensure that the primary fraction output by the pyrolyzer kiln is in the gas phase rather than liquid.

Therefore, in the pyrolyzer kiln 3, the feedstock material is converted into a primary volatile (gas) fraction and a secondary solids (char) fraction. In the pyrolyzer kiln 3, the char and gas fractions are separated in a gas/solid separator. The char material is removed as either a by-product or a waste effluent stream depending on the quality of the material, the gas (off-gas) is sent for further processing. According to the present invention, the gas fraction is the main product of the pyrolysis stage of the process.

The off-gas will contain dust and organic 'tar' material as it exits the pyrolyzer kiln 3. The dust can be removed in an optional dust removal process stage 4. Conventional equipment for dust removal includes cyclonic separators & candle-filters. This dust removal step can occur at any point in the gas handling section of the process.

The off-gas then enters a 'superheat' stage 5 in which oxygen is injected to generate the additional heat required for steam-reforming of the tar fraction. Here the oxygen addition allows a portion of the off-gas to combust and hence generate heat, typically operating at between 900-1400° C. In addition, steam will also be produced by the combustion process which is required for the steam-reforming reactions to occur in the presence of a suitable catalyst. The tar component of the off-gas is reduced by reforming the tar molecules into carbon-monoxide and hydrogen using steam as the reaction medium. This step increases the calorific value of the off-gas stream, increases the overall conversion efficiency of the original biomass material & also reduces the amount of tar recovered in the subsequent cleaning steps which reduces the amount of handling required for the tar material.

The off-gas then enters a water-conditioning process stage 6 whereby the gas is contacted counter-currently with water which cools the gas & also removes dust. The gas is typically cooled below 300° C. to a minimum of 120° C. The cooling of the gas results in condensation of the 'heavy-tar' fraction whereby higher-boiling point organic components are removed from the gas phase by condensation. The 'tarry-water' produced is sent for subsequent treatment & the tar fraction of the water is recycled back into the kiln to recover its residual energy content or else sent to waste.

The next step of the process is to further cool the off-gas using a water based scrubber 7. Here the gas is contacted counter-currently in a packed tower system using water as the scrubbing medium. In this step the gas temperature is reduced below 100° C. (between 100° C. & ambient temperature). The remaining 'light-tar' & water content of the off-gas are removed in this step by condensation to further clean the gas & enhance its calorific value. Other contaminants such as hydrogen chloride, ammonia & hydrogen sulphide are also removed in this step.

The cleaned off-gas then enters the methanation process stage 8 in which the gas is compressed in compressor 8a from atmospheric pressure to between 4-30 barg and passed through a catalyst bed reactor 8b to further enhance the calorific value of the gas. Here carbon dioxide (which has no residual calorific value) is reacted with hydrogen to produce methane ($CH_4$) at a temperature of between 150-500° C. The resulting gas stream is then decompressed 8c to atmospheric pressure. The optimal arrangement for this step would use a conventional 'Turboexpander' whereby the compression energy would partly come from the energy recovered when expanding the gas back to atmospheric pressure. Otherwise a pressure-reducing-valve could be used to reduce the pressure.

The next process stage 9 involves removing carbon dioxide from the gas to further enhance the calorific value. Here, one method of carbon dioxide removal would be to use an amine-based scrubber system to absorb $CO_2$ from the gas stream. Here, a liquid amine solution is contacted with the off-gas in a counter-current column (absorber) and captures the $CO_2$ via a reversible chemical reaction. The $CO_2$-rich amine stream, leaving from the absorber from the bottom, is regenerated by thermal treatment in another regeneration column (desorber), releasing the captured $CO_2$. The $CO_2$ stream leaving from the top of the desorber could be further processed to produce a $CO_2$ product stream, captured & stored or discharged as a waste stream.

The off-gas is then split into two portions; one portion is fed back to the kiln burners to provide the energy necessary for the pyrolysis process & the reaming portion is sent for use elsewhere i.e. to produce electricity in a gas engine 10, stored for further use, generate power in a gas turbine, utilized to produce synthetic chemicals etc.

The present invention is directed to the production of synthetic natural gas (SNG) from carbonaceous materials, such as biomass, coal or refuse-derived-fuel (RDF) using pyrolysis. Pyrolysis is the process of thermo-chemical degradation of the biomass feed-stock in a specially controlled atmosphere whereby the biomass is converted into liquid, gas and solid char fractions. The fraction of each solid/liquid/gas phase produced is a function of the conditions in the pyrolysis reactor. During the pyrolysis process, large hydrocarbon molecules of the parent biomass material are broken down into smaller hydrocarbon molecules. 'Fast pyrolysis' produces mainly a liquid fraction, known as bio-oil; slow pyrolysis produces mainly gas and solid char fractions. The present invention utilises 'slow pyrolysis' as the means of converting the biomass material into SNG whereby the carbonaceous material spends several minutes in the reaction zone.

The invention provides a processing system and method using slow pyrolysis, which results in the evolution of a gaseous product that has a sufficiently high calorific value to enable its use as a fuel such as a Synthetic Natural Gas (Syngas or SNG) fuel. The invention provides a process that is highly efficient and suitable for application in relatively small scale situations, for example for producing fuel for use in generation systems of the order of 10 MW. Efficiency is achieved by means of splitting a proportion of the processed gas and diverting to the gas burner of the kiln. Efficiency is also achieved by means of using an indirect fired rotary kiln, and closely controlling process parameters to ensure that sufficient moisture is present in the material to enable steam reforming using the moisture content of the gas alone without the need to add steam at the reformer stage.

The invention claimed is:

1. A system for processing carbonaceous in-feed material, the system comprising:
  an indirect fired horizontal rotary pyrolyzer kiln configured to generate a pyrolyzing temperature between 600 C and 950 C for pyrolysis of the carbonaceous in-feed material, wherein the kiln, when so configured, generates an off-gas in a slow pyrolysis process in which the in-feed material is pyrolyzed in the kiln at the pyrolyzing temperature for a period of minutes in order to produce the off-gas, wherein the off-gas comprises dust and tar components;
  a steam reformer positioned downstream of the kiln and configured to produce at least hydrogen from the off-gas, wherein oxygen is injected to allow a portion of the off-gas to combust to generate heat and steam, wherein the steam is used as a reaction medium to reform the tar into carbon-monoxide and hydrogen components;
  a water scrubber positioned downstream of the steam reformer and configured to counter-currently contact the off-gas by water to cool off the off-gas to a temperature below 100 degrees Celsius to remove water from the off-gas;
  a methanation stage including a compressor and a catalyst bed reactor, the methanation stage configured to compress the off-gas in the compressor and pass the compressed off-gas through the catalyst bed reactor where it is reacted with hydrogen to produce methane from the off-gas;
  a carbon dioxide scrubbing stage configured to remove carbon dioxide from the off-gas; and
  splitting means for splitting the off-gas into portions and directing at least one portion of the split off-gas to the kiln.

2. The system according to claim 1, wherein the splitting means is provided downstream of the water scrubber and the steam reformer.

3. The system according to claim 1, wherein the proportion of the off-gas split off and directed to the kiln is 30% or less by volume.

4. The system according to claim 1, wherein the proportion of the off-gas split off and directed to the kiln is 20% or less by volume.

5. The system according to claim 1, wherein the off-gas directed by the splitting means to the kiln is combusted by the kiln.

6. The system according to claim 1, wherein the splitting means is positioned downstream of the methanation stage.

7. The system according to claim 1, wherein the splitting means is positioned downstream of the carbon dioxide scrubbing stage.

8. The system according to claim 1, wherein the primary output from the kiln is gas rather than liquid.

9. The system according to claim 1, wherein the moisture content of the off-gas that exits the kiln is sufficiently high such that steam for the steam reformer is self generated.

10. The system according to claim 1, wherein the kiln is mounted to rotate about a horizontal axis.

11. The system according to claim 1, wherein the carbon dioxide scrubbing stage is positioned downstream of the methanation stage.

12. The system according to claim 1, wherein the carbonaceous material is held in the kiln for a pyrolyzation time of between 1 and 60 minutes.

13. The system according to claim 1, wherein the steam reformer operates at a temperature in the range of 900 C to 1400 C.

14. The system according to claim 1, wherein Oxygen is supplied to the steam reformer.

15. The system according to claim 1, wherein before entering the kiln, in-feed gas is passed through a pre-dryer stage.

16. The system according to claim 1, wherein the kiln includes a gas/solid separator in which the char and gas fractions are separated.

17. A method for processing carbonaceous in-feed material, the method comprising:
  feeding the carbonaceous in-feed material into an indirect fired horizontal rotary pyrolyzer kiln, wherein the kiln is configured to generate a pyrolyzing temperature between 600 C to 950 C;
  pyrolyzing, at the pyrolyzing temperature, the in-feed material in the kiln for a period of minutes to produce an off-gas that includes dust and tar components;
  directing the off-gas from the kiln to a steam reformer positioned downstream of the kiln, and injecting oxygen to allow a portion of the off-gas to combust to generate heat and steam, wherein the steam is used as a reaction medium to reform the tar into carbon-monoxide and hydrogen components;
  subsequently directing the off-gas through a water scrubber stage, a methanation stage, and a carbon dioxide scrubbing stage, each stage being positioned downstream of the steam reformer, wherein the water scrubber stage includes counter-currently contacting the off-gas by water to cool the off-gas to a temperature below 100 degrees Celsius to remove water from the the off-gas, and wherein the methanation stage includes compressing the off-gas in a compressor and passing the compressed off-gas through a catalyst bed reactor where it is reacted with hydrogen to produce methane; and
  splitting the off-gas into portions and directing at least one portion of the split off-gas to the kiln.

18. The method according to claim 17, wherein the pyrolyzing temperature in the kiln is in the range of 750 C to 850 C and the in-feed material is pyrolyzed in the kiln in the temperature range of 750 to 850 degrees Celsius.

19. The method according to claim 18, wherein the period of minutes is between 1 and 60 minutes.

20. The system according to claim 1, wherein the water scrubber is configured to further remove from the off-gas at least one unwanted component selected from the group consisting of tar, hydrogen chloride, ammonia, and hydrogen sulfide.

21. The method according to claim 17, wherein the proportion of the off-gas split off and directed to the kiln is 30% or less by volume.

22. The method according to claim 17, wherein the primary output from the kiln is gas rather than liquid.

23. The method according to claim 17, further comprising supplying oxygen to the steam reformer.

24. The method according to claim 17, further comprising before entering the kiln, passing the in-feed material through a pre-dryer stage.

* * * * *